United States Patent [19]

Moist et al.

[11] Patent Number: 4,809,798

[45] Date of Patent: Mar. 7, 1989

[54] TRANSPORT CARRIER APPARATUS

[76] Inventors: Wayne K. Moist, Route 1, Box 16; Bernard L. Dunker, 416 Parker Street, both of Ovid, Colo. 80744

[21] Appl. No.: 52,424

[22] Filed: May 21, 1987

[51] Int. Cl.⁴ .............................................. B62D 51/04
[52] U.S. Cl. .................................. 180/19.1; 172/256; 180/24.12; 280/47.26; 414/426
[58] Field of Search ................... 180/19.1, 19.2, 19.3, 180/6.2, 9.1, 24.1, 24.11, 24.12; 414/426, 908, 910; 280/47.11, 47.26, 47.34, 47.35, 651, 659; 172/42, 43, 256; 56/14.7

[56] References Cited

U.S. PATENT DOCUMENTS

| | | | |
|---|---|---|---|
| 2,451,553 | 10/1948 | Hedquist | 280/770 |
| 2,827,972 | 3/1958 | West | 180/19.1 |
| 2,855,061 | 10/1958 | Lilienthal | 180/19.1 |
| 2,869,661 | 1/1959 | Fernandez | 180/19.1 |
| 2,943,863 | 7/1960 | Corey | 414/426 |
| 3,135,346 | 6/1964 | Bertozzi | 180/19.1 |
| 3,295,622 | 1/1967 | Pitchford | 280/47.11 |
| 4,407,381 | 10/1983 | Oswald | 180/24.12 |
| 4,645,022 | 2/1987 | Bergquist | 180/19.3 |

FOREIGN PATENT DOCUMENTS

| | | | |
|---|---|---|---|
| 1199697 | 12/1959 | France | 180/19.1 |
| 610279 | 10/1960 | Italy | 180/19.2 |
| 2172862 | 10/1986 | United Kingdom | 180/9.1 |

Primary Examiner—John A. Pekar
Assistant Examiner—Everett G. Diederiks, Jr.
Attorney, Agent, or Firm—Dean P. Edmundson

[57] ABSTRACT

Transport carrier apparatus and techniques are described for transporting repair items to and from an agricultural pivot sprinkler device of the type used to irrigate row crops. The apparatus is self-propelled and includes: (a) a frame having an open front to receive repair items, (b) support area at the front of the frame to support the repair items being transported, (c) at least four wheels attached to the frame to support it above the ground, (d) a power source (e.g., a gasoline engine) for driving the wheels, and (e) handles on the rear portion of the frame for steering the apparatus. The transport apparatus is sufficiently narrow to enable it to travel between adjacent rows of growing row crops so that replacement wheels, gear boxes, etc. can be transported to and from a tower of the sprinkler system without trampling the crops. In a preferred embodiment the apparatus includes a transmission having forward and reverse gears.

11 Claims, 4 Drawing Sheets

TRANSPORT CARRIER APPARATUS

FIELD OF THE INVENTION

This invention relates to carrier devices. More particularly, this invention relates to transport carrier devices which are especially useful for transporting repair items to and from an agricultural pivot sprinkler device used to irrigate row crops.

BACKGROUND OF THE INVENTION

Large pivot sprinkler devices are commonly used to irrigate large fields of row crops. The pivot sprinkler comprises an elongated tubular member which is supported at various points along its length by means of a wheeled upright support or tower. Water enters the tubular member at one end (e.g., at the center of the field) and exits the tubular member through sprinkler heads at various points along its length to irrigate the crops under the sprinkler. Each wheeled upright support includes two driven wheels to thereby cause the sprinkler unit to rotate about its fixed end (where the water is pumped into the tubular member). Consequently, the sprinkler unit pivots in a large circle. Thus, this type of sprinkler system is often referred to as a center pivot sprinkler system.

Occasionally a wheel on one of the support members or towers requires repair or replacement. Similarly, there is an occasional need to repair or replace a gear box on one of the support members.

For example, a tube in a tire may fail, or a valve stem may break, or a hub may break, etc. As a result, the wheel would have to be replaced or repaired. This means that the tower would have to be jacked up, the wheel removed and transported out of the field to a repair shop, and a replacement wheel would have to be transported into the field and to the tower. Also, if a gear box failed and required repair at a repair shop, the gear box must be taken off and transported out of the field, and a repaired or new gear box would have to be transported into the field and to the tower.

These items are bulky and very heavy. For example, a wheel could weigh about 400 pounds if it is caked and filled with mud.

Consequently, it is not practical to attempt to manually transport or carry a wheel or even a gear box to or from a tower in the field. This is especially true if the tower requiring the repairs is located near the center of the field. The task is made even more difficult when you consider that the soil has been irrigated and therefore is quite soft and muddy. Also, the humidity in the field is very high.

Although one could use a tractor and trailer, or a pickup truck, to transport repair items to and from the tower requiring repair, this results in at least two rows of crops being knocked down or ruined. Typical spacing of row crops in fields is about 30 inches. Naturally, a tractor or a pickup truck is several feet wide and therefore requires considerable space as it moves through a field. Also, more crops must be trampled if the tractor or truck is to be turned around when it reaches the tower requiring the repairs.

It is possible to hang a replacement wheel on a tower in anticipation of a wheel needing replacement. However, this adds extra weight to the sprinkler system and also involves much expense in larger systems where there may be, for example, twenty wheels present.

There has not heretofore been provided effective or efficient apparatus or techniques for transporting repair items to and from a tower or support structure in a center pivot sprinkler irrigation system.

SUMMARY OF THE PRESENT INVENTION

In accordance with the present invention there is provided self-propelled transport carrier apparatus and systems for transporting repair items to and from an agricultural pivot sprinkler device of the type used to irrigate row crops. The self-propelled apparatus is adapted to travel between two adjacent rows of the row crops and comprises, in one embodiment:
 (a) a frame member having front and rear portions; wherein the front portion is open to receive and carry repair items (e.g., a wheel, gear box, etc.);
 (b) support means at the front portion of the frame for supporting the repair items being transported;
 (c) at least four wheels rotatably attached to the frame member for supporting the frame above the ground;
 (d) a power source comprising a motor (preferably a gasoline engine) which is adapted to drive the wheels; and
 (e) handle means attached to the rear portion of the frame member for steering the apparatus.

Because the apparatus is very narrow it will fit comfortably between two adjacent rows of growing row crops. Thus, even when the crops are very mature, the apparatus will still be operable between adjacent rows of crops.

Preferably the apparatus includes a transmission with a number of gears, including forward and reverse. It is also possible in another embodiment to include six wheels which are all driven by the motor.

The apparatus can be operated and handled easily by one person, and it can be easily loaded into a pickup truck or onto a trailer for transport down the highway.

Other advantages of the transport carrier apparatus and systems of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
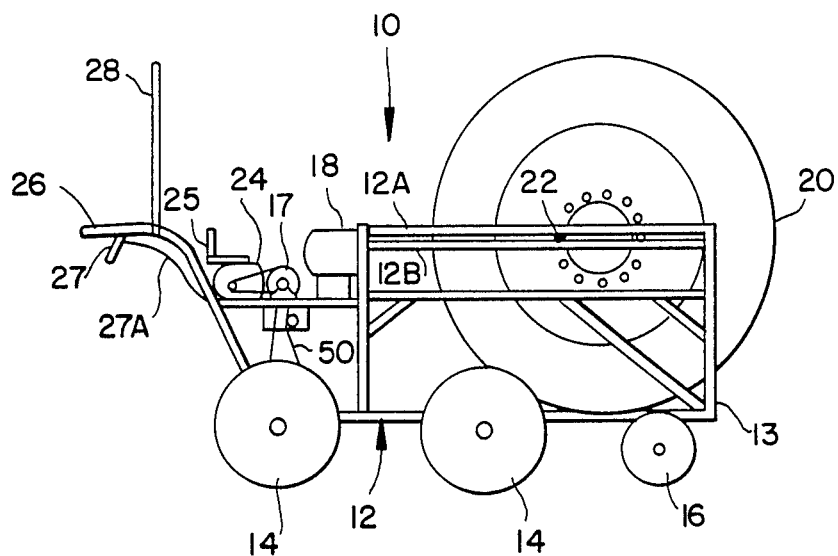
FIG. 1 is a side elevational view of one embodiment of transport carrier apparatus of the invention.

In FIG. 1 there is shown a side elevational view of one embodiment of transport carrier apparatus 10 of the invention. In this embodiment there are six drive wheels (three on each side) which support the frame member 12.

Two of the wheels 14 on each side are typically of the same size while the forward wheel 16 on each side has a smaller diameter. For example, wheels 14 preferably include 6 inch diameter rims, and wheel 16 is on an eight inch diameter rim. The reason for having smaller wheel 16 at the forward end 13 of the frame 12 is to allow more room within the frame for a large pivot sprinkler tire or wheel 20 to be received therein for transport by the apparatus. Wheels 14 and 16 are preferably pneumatic rubber tires, although metal wheels or solid rubber wheels could also be used, if desired.

The frame 12 is elongated and preferably includes two spaced-apart, parallel upright side members, as illustrated. The base of the frame and the two upright side members form support means for holding the large sprinkler tire or wheel, as illustrated in FIG. 1. The tire or wheel 20 is simply rolled onto the base of the frame between the upright side members. The sprinkler wheel can be retained within the frame by means of a bolt 22 which passes through one of the mounting holes in the rim of the wheel and is releasably secured to the top of the frame between parallel rails 12A and 12B. Preferably another similar bolt is passed through another mounting hole in the rim of the wheel and is releasably secured in a similar manner to the top of the opposite side of the frame.

Figure 5:
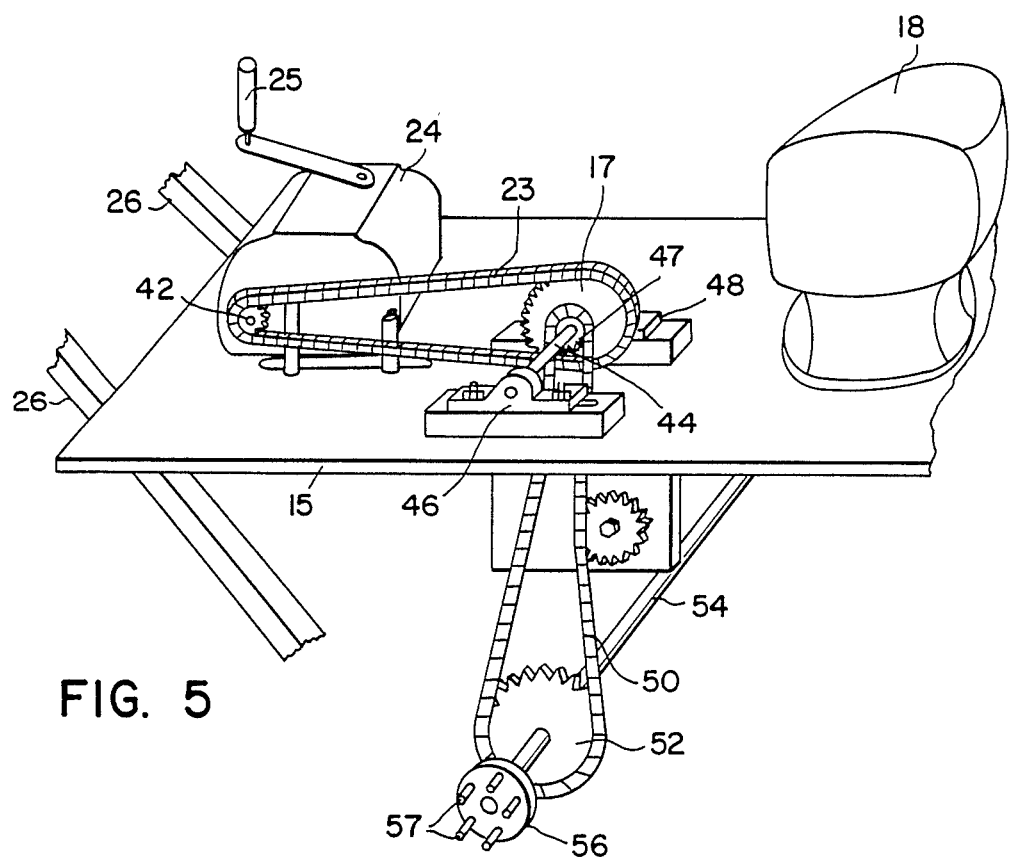
FIG. 5 illustrates the power source and transmission used in the apparatus of the invention.
Figure 7:
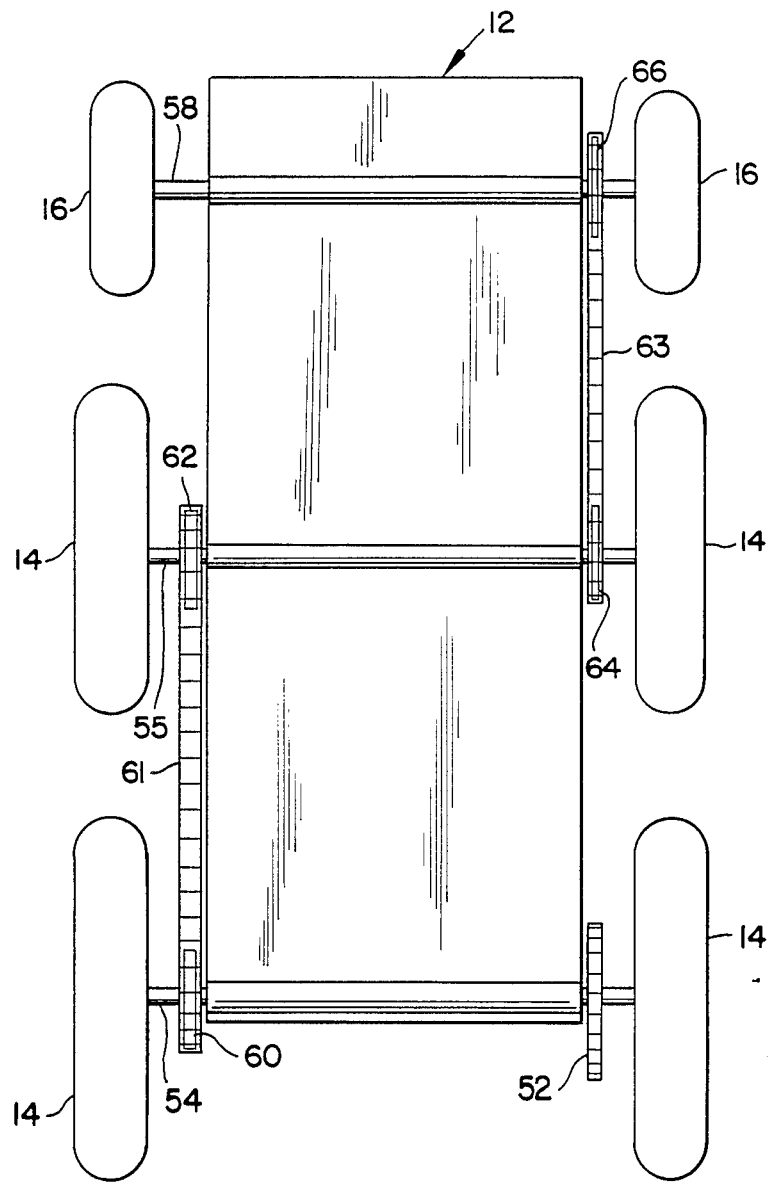
FIG. 7 illustrates the manner in which all of the axles are power driven by the power source.

A power source 18, e.g., a gasoline engine, is secured to shelf 15 on the frame member. A transmission 24 is also secured to the shelf 15 and is operably connected to the power source. Preferably the transmission includes forward and reverse gears, and more preferably there are several forward gear speeds (e.g., 5). A particularly useful type of transmission for this purpose is commercially available from Tecumseh. Shift lever 25 enables the operator to easily shift gears while operating the apparatus. A drive chain 23 transfers power from the transmission 24 to a drive gear 17 which is adapted to drive the wheels (as illustrated in FIGS. 5 and 7).

Figure 6:
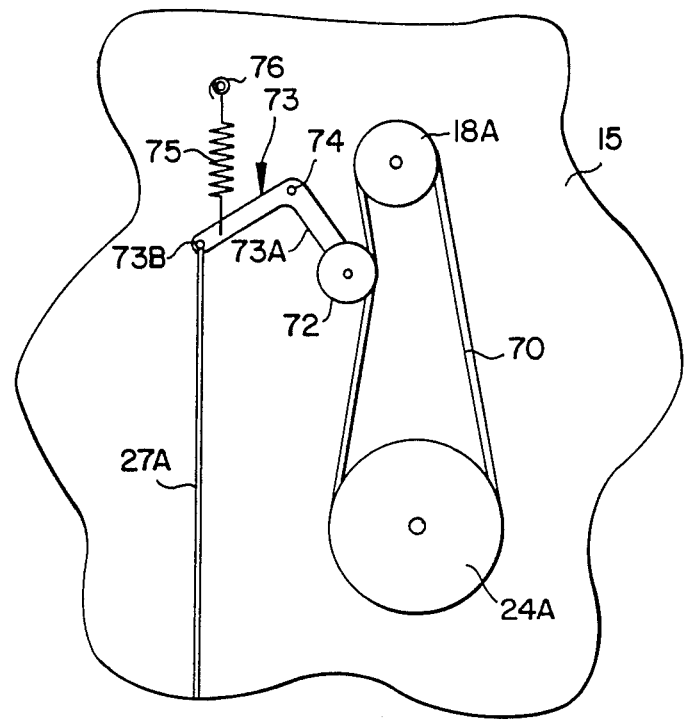
FIG. 6 illustrates one manner in which the power source is operably connected to the transmission.

The handles 26 project rearwardly from the frame and enable the operator to drive and steer the apparatus. A clutch handle 27 is pivotably mounted on one of the handles 26 and is operably connected by cable 27A to a clutch assembly. This is illustrated in FIG. 6. The operation of the clutch is such that the handle 27 must be held in an upward position in order to engage the clutch and cause the apparatus 10 to be driven either forwardly or rearwardly. If the clutch handle 27 is released, a spring causes the clutch to disengage the motor 18 from the transmission 24.

There is preferably an upwardly projecting deflector bar 28 attached to each handle 26 just forwardly of the operator position. The deflectors extend upwardly several inches (e.g., 24–40 inches) or any desired height and serve to deflect the leaves of tall row crops (e.g., corn) away from the operator as the apparatus is driven between adjacent rows to and from the pivot sprinkler tower to be repaired in the field. The deflector bars may be removable, if desired.

Figure 2:
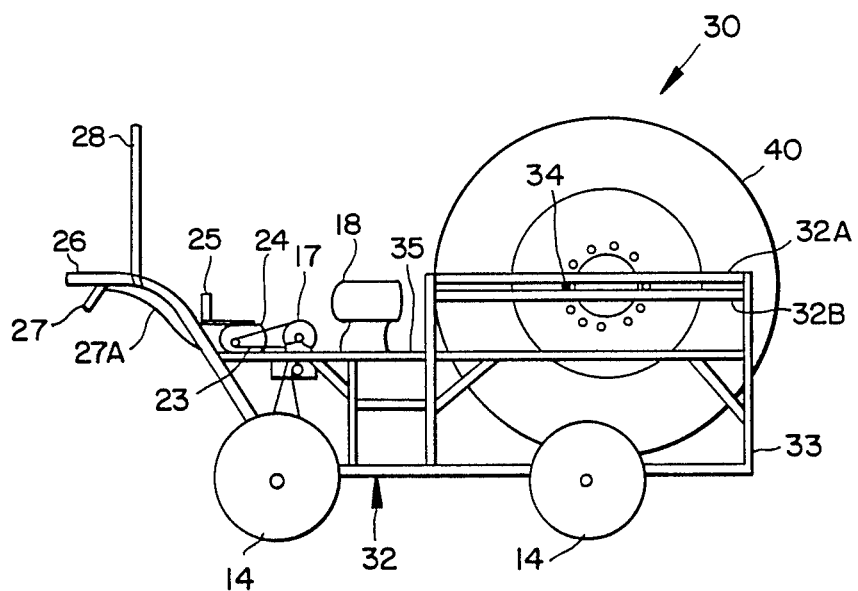
FIG. 2 is a side elevational view of another embodiment of transport carrier apparatus of the invention.

In FIG. 2 there is shown a side elevational view of another embodiment of transport carrier apparatus 30 of the invention including four drive wheels. Two drive wheels 14 are located on each side of the frame 32.

A sprinkler tire or wheel 40 can be supported and retained in the forward portion of the apparatus by rolling it onto the base of the forward end 33 of the frame. The tire can be releasably retained between two spaced-apart, parallel upright side members, as illustrated, by means of a bolt 34 which passes through one of the mounting holes in the rim of the sprinkler wheel and is releasably secured to the top of the frame between parallel rails 32A and 32B. Preferably another similar bolt is passed through another mounting hole in the rim of the wheel and is releasably secured in a similar manner to the top of the opposite side of the frame.

A power source 18, e.g., a gasoline engine, is secured to shelf 35 on the frame member. Transmission 24, clutch handle 27 and cable 27A, handles 26, deflectors 28, and drive chain 23 are as described above in connection with the embodiment shown in FIG. 1.

Figure 3:
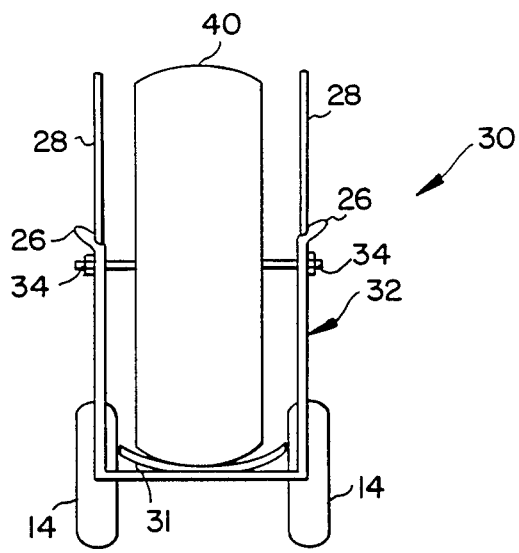
FIG. 3 is a front view of the carrier apparatus shown in FIG. 2.

FIG. 3 is a front elevational view of the embodiment of apparatus shown in FIG. 2. In this view the sprinkler tire or wheel 40 is shown positioned between the spaced-apart parallel upright support members comprising the frame. Bolts 34 releasably retain the tire 40 within the frame for transport. The bottom of the tire 40 is resting on the curved base section 31.

The transport carrier apparatus of this invention is very narrow, i.e., preferably having a total overall width of less than about 25 inches or so. This assures that the carrier apparatus can be easily operated between adjacent rows of growing row crops. Typically row crops have a spacing of at least about 30 inches.

The length of the transport carrier apparatus of the invention may vary. Preferably the apparatus has a length in the range of about 4 to 6 feet.

Figure 4:
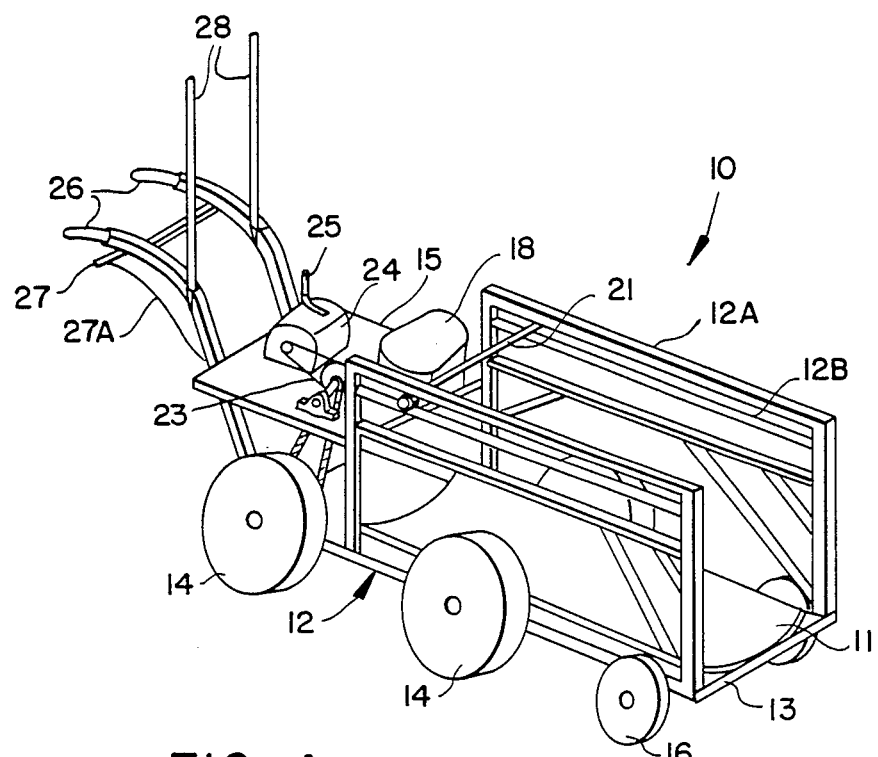
FIG. 4 is a front perspective view of the transport carrier apparatus of FIG. 1 (without the sprinkler wheel)

FIG. 4 illustrates a front perspective view of the embodiment of transport carrier apparatus 10 shown in FIG. 1 (without the sprinkler tire present). In this view it is possible to see the curved base section 11 for supporting the underside of the sprinkler tire between the two spaced-apart upright support frame members.

If desired, a movable horizontal bar 21 may extend between the two side members of the frame. This bar may serve as a support against which one side of the sprinkler tire may rest while it is being transported by the carrier apparatus. Each end of the horizontal bar 21 may include a bolt or threaded end to enable a nut on the end thereof to be tightened to secure the rod to each upright support member. The rod 21 may be moved forwardly or rearwardly to accommodate sprinkler tires of different diameters.

FIG. 5 illustrates the manner in which the transmission is adapted to drive the rear axle in the transport carrier apparatus. Thus, gear 42 is secured to a driven shaft which extends outwardly from the transmission. Chain 23 connects between gear 42 and larger gear 17 on shaft 44 which is rotatably supported on shelf 15 by mounting supports 46 and 48. Smaller gear 47 is also secured to shaft 44 so that gear 47 is driven at the same speed as gear 17.

Chain 50 is trained around gear 47 on shaft 44 and gear 52 which is secured to rear axle 54. The rear axle 54 is rotatably carried by the underside of the frame of the apparatus. A wheel is secured to the hub 56 by means of stud bolts 57. The opposite end of axle 54 also includes a hub for the mounting of a wheel thereon. If desired, an idler gear may be included to maintain proper tension on chain 50.

FIG. 7 illustrates one manner in which all of the axles of a multi-axle carrier apparatus can be driven simultaneously. In this embodiment there are three axles 54, 55, and 58. Each of the axles is rotatably supported on the underside of the base of the frame member 12.

Axle 54 includes gear 60 secured thereto. Axle 55 includes gear 62 secured thereto near one end and gear 64 secured near its opposite end, as illustrated. Axle 58 includes gear 66 secured thereto. Chain 61 extends around gear 60 on axle 54 and gear 62 on axle 55. Chain 63 extends around gear 64 on axle 55 and gear 66 on axle 58.

Thus, as chain 50 drives gear 52 on axle 54, gear 60 drives gear 62 on axle 55 (via chain 61). Also, at the same time, gear 64 on axle 55 drives gear 66 on axle 58 (via chain 63). All of the axles are accordingly driven at the same speed and in the same direction. If desired, conventional idlers may be carried by the frame 12 to maintain proper tension in each of the drive chains.

The embodiment shown and illustrated in FIG. 7 is for a six wheel drive unit. In the four wheel drive unit there are only two axles to be driven in a similar manner.

FIG. 6 illustrates one manner in which the clutch mechanism may operate to selectively engage or disengage the power source to or from the transmission. The view is from under the shelf 15 looking upwardly. Flexible belt 70 (e.g., a V-belt) extends around pulley 18A driven by the motor 18 and pulley 24A which is secured to the input shaft of transmission 24. Idler pulley 72 is carried on the end of arm 73A of assembly 73.

Idler pulley 72 is freely rotatable and is adapted to be moved toward belt 70 to tighten the belt and thereby cause pulley 18A to drive pulley 24A. When idler pulley 72 is moved away from belt 70 the belt is loosened and will not drive pulley 24A, i.e., the clutch is disengaged.

Clutch assembly 73 is pivotably mounted by means of bolt or pin 74 to the underside of the shelf 15. Clutch cable 27A is connected at one end to arm 73B of the assembly 73. Thus, when clutch cable 27A is pulled by the operator (via clutch handle 27) the clutch assembly 73 is caused to pivot relative to bolt or pin 74 to thereby cause idler 72 to be urged against drive belt 70.

A spring member 75 is connected at one of its ends to arm 73B of assembly 73 and is connected at its opposite end to pin 76 on the underside of shelf 15. Thus, spring 75 urges or biases the clutch assembly to a normally disengaged position (i.e., to a position where idler pulley 72 is away from drive belt 70). When the clutch handle 27 is lifted upwardly to tighten cable 27A, the cable must overcome the force of the spring 75. When the clutch handle 27 is released by the operator, the spring 75 automatically moves the clutch assembly to the disengaged position. This is a safety feature which causes the apparatus to stop in the event that the operator releases the clutch handle for any reason.

The apparatus of this invention is steered or guided by the operator by placing more weight on one handle than the other and by pushing the handles to one side or the other. Normally this provides sufficient control to cause the apparatus to travel in the desired direction as it proceeds between adjacent rows of row crops.

The size of the engine used on the carrier apparatus may vary. Typically, a four horsepower engine is very adequate. The throttle control may be located on the engine or, if desired, a throttle cable may extend from the engine to the handle area near the operator. It would be possible to use an electric motor but then it would be necessary to include a large battery.

The frame of the apparatus is preferably made of steel or iron tubing. Other materials could be used if they have the required structural integrity.

Although the apparatus has been illustrated for transporting a sprinkler wheel to and from a sprinkler tower in the field, the apparatus is also useful for transporting other repair items, e.g. a gear box for the sprinkler system, jacks, tools, etc.

Other variants and modifications are possible without departing from the scope of the present invention.

What is claimed is:

1. Apparatus for transporting repair items to and from an agricultural pivot sprinkler device of the type used to irrigate row crops, said apparatus being self-propelled, guided by a walking attendant, and comprising:
    (a) a frame member having front and rear portions, wherein said front portion is open to receive said repair items;
    (b) support means at said front portion of said frame member for support said repair items being transported wherein said support means includes a floor member and spaced apart upright side support members carried by said frame member; wherein said floor member is located between said upright side support members;
    (c) at least four wheels rotatably attached to said frame member for supporting said frame member above the ground; wherein two of said wheels are attached to a front axle carried by said front portion of said frame member, and wherein two of said wheels are attached to a rear axle carried by said rear portion of said frame member; wherein said front and rear axles each include a drive gear secured thereto, and wherein a drive chain is operably connected between said gears on said front and rear axles;
    (d) a power source comprising a motor, said power source being adapted to drive said wheels; wherein said power source further includes a transmission having forward and reverse gears, wherein said apparatus is adapted to be driven selectively forwardly and rearwardly;
    (e) handle means attached to said rear portion of said frame member for steering said apparatus; wherein said apparatus, at its widest location, being less then thirty inches wide so as to be adapted to travel between two adjacent rows of said row crops to said sprinkler device.

2. Apparatus in accordance with claim 1, further comprising reduction gear means operably connected between said transmission and said wheels.

3. Apparatus in accordance with claim 1, further including clutch means which is adapted to selectively connect and disconnect said transmission from said motor, wherein said clutch means includes a lever which is movable between (a) an engage position where said transmission is engaged with said motor, and (b) a disengage position where said transmission is disengaged from said motor; wherein said lever is normally biased toward said disengage position.

4. Apparatus in accordance with claim 1, wherein said motor is a gasoline engine.

5. Apparatus in accordance with claim 1, wherein said handle means further includes deflector members which are adapted to deflect said row crops away from said handle means when said apparatus is driven between adjacent rows of said crops.

6. Apparatus in accordance with claim 1, wherein there are six said wheels; wherein two of said wheels are attached to a front axle carried by said front portion of said frame member; wherein two of said wheels are attached to a rear axle carried by said rear portion of said frame member; wherein two of said wheels are attached to a third axle carried by said frame between said front and rear axles; wherein each said axle is adapted to be driven by said power source.

7. Self-propelled apparatus for transporting repair items to and from an agricultural pivot sprinkler device of the type used to irrigate row crops, said apparatus being self-propelled, guided by a walking attendant, and comprising:
   (a) a frame member having front and rear portions, wherein said front portion is open to receive said repair items;
   (b) support means at said front portion of said frame member for supporting said repair items being transported; wherein said support means includes a floor member and spaced apart upright side support members carried by said frame member; wherein said floor member is located between said upright side support members; wherein said side support members are parallel to each other;
   (c) at least four wheels rotatably attached to said frame member for supporting said frame member above the ground; wherein two of said wheels are attached to a front axle carried by said front portion of said frame member, and wherein two of said wheels are attached to a rear axle carried by said rear portion of said frame member; wherein said front and rear axles each include a drive gear secured thereto, and wherein a drive chain is operably connected between said gears on said front and rear axles;
   (d) a power source comprising a motor, said power source being adapted to drive said wheels;
   (e) a transmission having forward and reverse gears, said transmission being operably connected between said motor and said wheels;
   (f) handle means attached to said rear portion of said frame member for steering said apparatus; wherein said handle means further includes deflector members which are adapted to deflect said row crops away from said handle means when said apparatus is driven between adjacent rows of said crops;
   (g) clutch means which is adapted to selectively connect and disconnect said transmission from said motor, wherein said clutch means includes a lever which is movable between (a) an engage position where said transmission is engaged with said motor, and (b) a disengage position where said transmission is disengaged from said motor; wherein said lever is normally biased toward said disengage position;

wherein said apparatus, at its widest location, being less than thirty inches wide so as to be adapted to travel between two adjacent rows of said row crops; and wherein said apparatus is adapted to be driven selectively forwardly and rearwardly.

8. Apparatus in accordance with claim 7, further including clutch means which is adapted to selectively connect and disconnect said transmission from said motor, wherein said clutch means includes a lever which is movable between (a) an engage position where said transmission is engaged with said motor, and (b) a disengage position where said transmission is disengaged from said motor; wherein said lever is normally biased toward said disengage position.

9. Apparatus in accordance with claim 7, wherein said motor is a gasoline engine.

10. Apparatus in accordance with claim 7, wherein there are six said wheels; wherein two of said wheels are attached to a front axle carried by said front portion of said frame member; wherein two of said wheels are attached to a rear axle carried by said rear portion of said frame member; wherein two of said wheels are attached to a third axle carried by said frame between said front and rear axles; wherein each said axle is adapted to be driven by said power source.

11. Apparatus in accordance with claim 7, wherein each said side support member includes an upper portion comprising spaced apart, parallel, horizontally disposed, elongated rail members which are adapted to carry a bolt therebetween for securing a repair wheel thereto for transport to said sprinkler device.

* * * * *